United States Patent
Akuta et al.

(10) Patent No.: US 7,832,522 B2
(45) Date of Patent: Nov. 16, 2010

(54) VEHICLE STEERING SYSTEM, VEHICLE INCLUDING THE SAME AND METHOD FOR TURNING WHEEL OF VEHICLE

(75) Inventors: Yoshimitsu Akuta, Wako (JP); Takuya Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 11/939,442

(22) Filed: Nov. 13, 2007

(65) Prior Publication Data

US 2008/0185212 A1    Aug. 7, 2008

(30) Foreign Application Priority Data

Feb. 6, 2007    (JP)    ............... 2007-027270

(51) Int. Cl.
    *B62D 3/00*    (2006.01)
(52) U.S. Cl. .............. 180/400; 180/402; 180/404; 180/405; 180/407; 701/41; 701/42; 701/43
(58) Field of Classification Search ........ 180/402, 180/404, 405, 407; 701/41, 42, 43; 192/84.31, 192/38.35; 364/424.051, 424.07, 426.031, 364/426.034, 424.048; 280/840; 303/146
    See application file for complete search history.

(56) References Cited

U.S. PATENT DOCUMENTS 5,732,371 A * 3/1998 Fujita ............... 701/38
6,871,717 B2 * 3/2005 Kada ............... 180/167

FOREIGN PATENT DOCUMENTS

JP    2005-029016    2/2005

* cited by examiner

*Primary Examiner*—Tony H. Winner
*Assistant Examiner*—Jacob Knutson
(74) *Attorney, Agent, or Firm*—Ditthavong Mori & Steiner, P.C.

(57) ABSTRACT

A vehicle steering system includes a steering wheel, a steering angle detector that detects a steering angle of the steering wheel, a steering angular speed calculator that calculates a steering angular speed of the steering wheel, a vehicle speed detector that detects a vehicle speed, a target rudder angle finding device, a modifying device, and an actuator. The target rudder angle finding device finds a target rudder angle based on the steering angle, the steering angular speed and the vehicle speed. The target rudder angle is a sum of a proportional term proportional to the steering angle and a differential term proportional to the steering angular speed. The modifying device modifies the differential term when the steering angular speed is negative to reduce a value of the differential term from that when positive. The actuator turns at least one wheel of the vehicle in accordance with the target rudder angle.

10 Claims, 6 Drawing Sheets

VEHICLE STEERING SYSTEM, VEHICLE INCLUDING THE SAME AND METHOD FOR TURNING WHEEL OF VEHICLE

CROSS-REFERENCE TO RELATED APPLICATIONS

The present application claims priority under 35 U.S.C. §119 to Japanese Patent Application No. 2007-027270, filed Feb. 6, 2007, entitled "Vehicle Steering Apparatus." The contents of this application are incorporated herein by reference in their entirety.

BACKGROUND OF THE INVENTION

1. Field of the Invention

The present invention relates to a vehicle steering system, a vehicle including the steering system, and a method for turning at least one wheel of a vehicle.

2. Background of the Invention

In recent years, a steer-by-wire system has been suggested in which a steering shaft coupled to a steering wheel is mechanically separated from a rudder mechanism that turns turning wheels, and the system electrically controls a steering motor provided in the system (for example, see Japanese Unexamined Patent Application Publication No. 2005-29016). Japanese Unexamined Patent Application Publication No. 2005-29016 is incorporated herein by reference in their entirety.

In addition to the steer-by-wire system, an active steering system has been also suggested in which the controlling amount of the rudder angle of turning wheels is variable with respect to the operating amount applied by a driver with a steering wheel. Such a steering system determines a target rudder angle of the turning wheels and turns the turning wheels corresponding to the determined target rudder angle.

The steering system determines a target rudder angle δf, on the basis of the sum of a proportional term that is proportional to a steering angle θh and a derivative term that is proportional to a steering angular speed θh' (time differential of the steering angle θh), for example, as follows:

$$\delta_f = K_0(V) \cdot \theta_h + K_1(V) \cdot \theta_h'$$

where V is a vehicle speed, $K_0(V)$ is a proportional control gain determined in accordance with the vehicle speed V, and $K_1(V)$ is a differential control gain determined in accordance with the vehicle speed V. Determining the target rudder angle $\delta_f$ on the basis of the sum of the proportional term and the differential term. In this way, the response of the vehicle corresponding to the steering operation can be improved.

Determining the target rudder angle can improve the response of vehicle behavior, however, the convergence of the behavior may be degraded. In particular, if the differential control gain K1(V) is set to a large value, then the response of the vehicle behavior to the steering operation performed by the driver can be further improved, whereas the convergence and stability of the vehicle behavior are degraded.

To be more specific, since the differential term is included, positive and negative values of the differential term may be reversed, for example, when the driver turns the steering wheel in a reverse direction. As a result, the target rudder angle may be markedly changed without a driver's intent, degrading the convergence and stability of the vehicle behavior.

SUMMARY OF THE INVENTION

According to one aspect of the present invention, a vehicle steering system includes a steering wheel, a steering angle detector, a steering angular speed calculator, a vehicle speed detector, a target rudder angle finding device, a modifying device, and an actuator. The steering angle detector is configured to detect a steering angle of the steering wheel. The steering angular speed calculator is configured to calculate a steering angular speed of the steering wheel. The vehicle speed detector is configured to detect a vehicle speed. The target rudder angle finding device is configured to find a target rudder angle based on the steering angle, the steering angular speed and the vehicle speed. The target rudder angle is a sum of a proportional term proportional to the steering angle and a differential term proportional to the steering angular speed. The modifying device is configured to modify the differential term when the steering angular speed is negative to reduce a value of the differential term from a value of the differential term with a positive steering angular speed. The actuator is configured to turn at least one wheel of the vehicle in accordance with the target rudder angle.

According to another aspect of the present invention, a vehicle includes a wheel, a steering wheel, a steering angle detector, a steering angular speed calculator, a vehicle speed detector, a target rudder angle finding device, a modifying device, and an actuator. The steering angle detector is configured to detect a steering angle of the steering wheel. The steering angular speed calculator is configured to calculate a steering angular speed of the steering wheel. The vehicle speed detector is configured to detect a vehicle speed. The target rudder angle finding device is configured to find a target rudder angle based on the steering angle, the steering angular speed and the vehicle speed. The target rudder angle is a sum of a proportional term proportional to the steering angle and a differential term proportional to the steering angular speed. The modifying device is configured to modify the differential term when the steering angular speed is negative to reduce a value of the differential term from a value of the differential term with a positive steering angular speed. The actuator is configured to turn the wheel of the vehicle in accordance with the target rudder angle.

According to the other aspect of the present invention, a method for turning at least one wheel of a vehicle includes detecting a steering angle of a steering wheel of the vehicle, calculating a steering angular speed of the steering wheel, detecting a vehicle speed, finding a target rudder angle, and actuating at least one wheel of the vehicle in accordance with the target rudder angle. The target rudder angle is found based on the steering angle, the steering angular speed and the vehicle speed. The target rudder angle is a sum of a proportional term proportional to the steering angle and a differential term proportional to the steering angular speed. The method further includes modifying the differential term when the steering angular speed is negative to reduce a value of the differential term from a value of the differential term with a positive steering angular speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
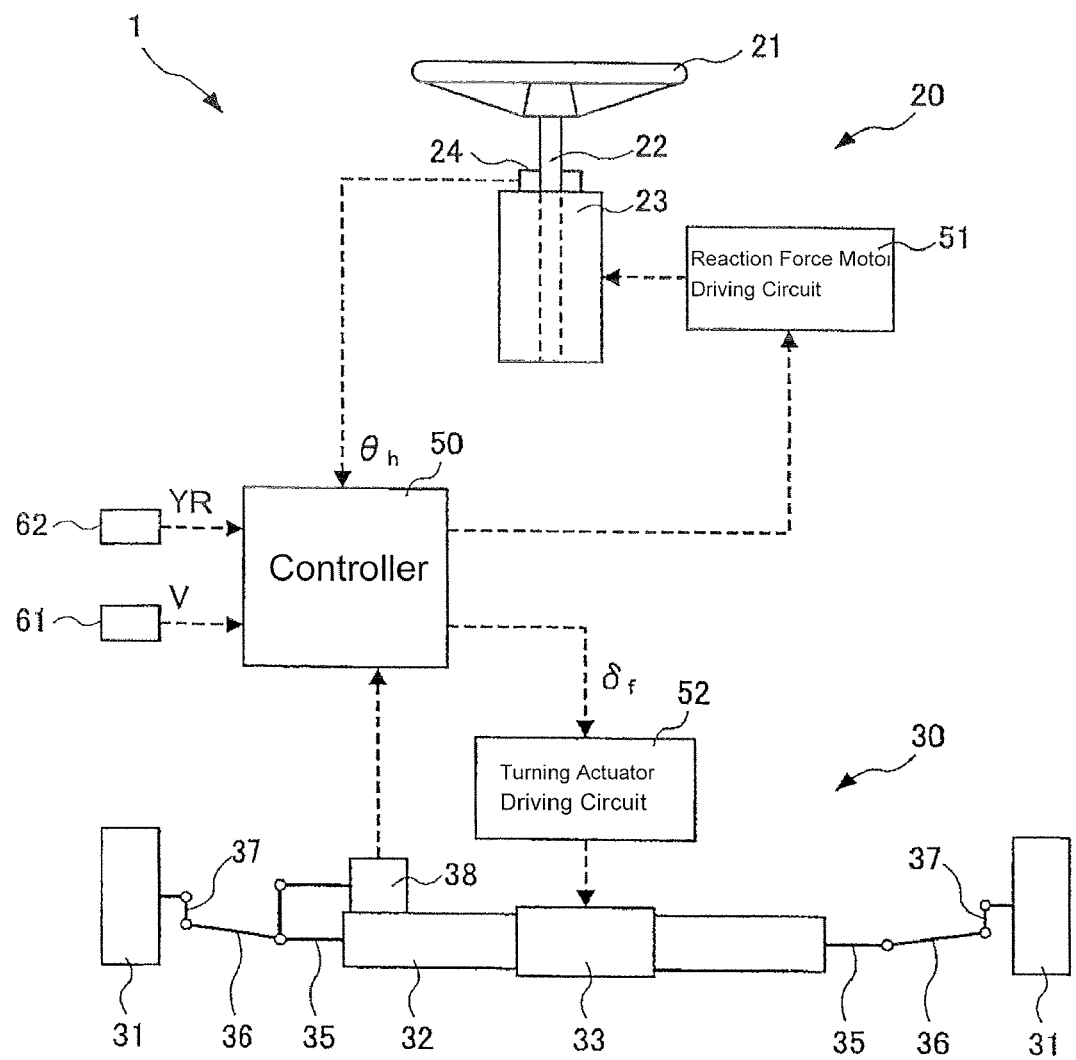
FIG. 1 is a schematic illustration showing a vehicle steering system according to an embodiment of the present invention.

The embodiments will now be described with reference to the accompanying drawings, wherein like reference numerals designate corresponding or identical elements throughout the various drawings.

A vehicle steering system (for example, vehicle steering system 1 described later) according to an embodiment of the present invention improves a response of vehicle behavior to a steering operation and a convergence of the vehicle behavior.

The vehicle steering system includes a steering wheel (for example, steering wheel 21 described later), steering angle detecting means (for example, steering angle detector 24 described later) that detects a steering angle of the steering wheel, vehicle speed detecting means (for example, vehicle speed detector 61 described later) that detects a vehicle speed, and a target rudder angle finding device (for example, a controller 50 described later), and a turning actuator (for example, turning actuator 33 described later). The target rudder angle finding device includes steering angular speed calculating means (for example, angular speed calculator 551 described later) that calculates a steering angular speed of the steering wheel. In the target rudder angle finding device, a target rudder angle (for example, given control rudder angle $\delta f$ described later) is found on the basis of the steering angle, the steering angular speed, and the vehicle speed. In the system, the turning actuator is driven in accordance with the set target rudder angle to turn turning wheels (for example, turning wheels 31, 31 described later). The target rudder angle is set on the basis of the sum of a proportional term (for example, proportional term $K0(V)\cdot\theta h$ described later) that is proportional to the steering angle, and a differential term (for example, differential term $K1(V)\cdot\theta h'$ described later) that is proportional to the steering angular speed. The target rudder angle finding device further includes a modifying device that modifies the differential term to be reduced when the steering angular speed is negative. Thus, the differential term with the negative steering angular speed is modified to be smaller than that with a positive steering angular speed.

With the configuration as described above, the target rudder angle is set on the basis of the sum of the proportional term that is proportional to the steering angle of the steering wheel, and the differential term that is proportional to the steering angular speed. Since the differential term is considered, the target rudder angle corresponds to the steering angular speed. Accordingly, the response of vehicle behavior to a steering operation performed by a driver can be improved. That is, when the driver rapidly operates the steering wheel, the target rudder angle is also rapidly changed; however, the response of the vehicle behavior can be improved.

Also, with the configuration as described above, when the steering angular speed is negative, that is, when the steering wheel is tuned backward, the differential term is modified to a smaller value. Accordingly, the target rudder angle is not seriously fluctuated without a driver's intent, for example, when the steering wheel is returned to the neutral position. This can prevent a convergence and stability of the vehicle behavior from being degraded. In particular, the configuration according to the embodiment of the present invention can prevent the convergence of lateral acceleration, which may cause the driver to feel uncomfortable, from being degraded. Thus, the response of the vehicle behavior to the steering operation and the convergence of the vehicle behavior can be improved. The further details are as follows.

Figure 7:
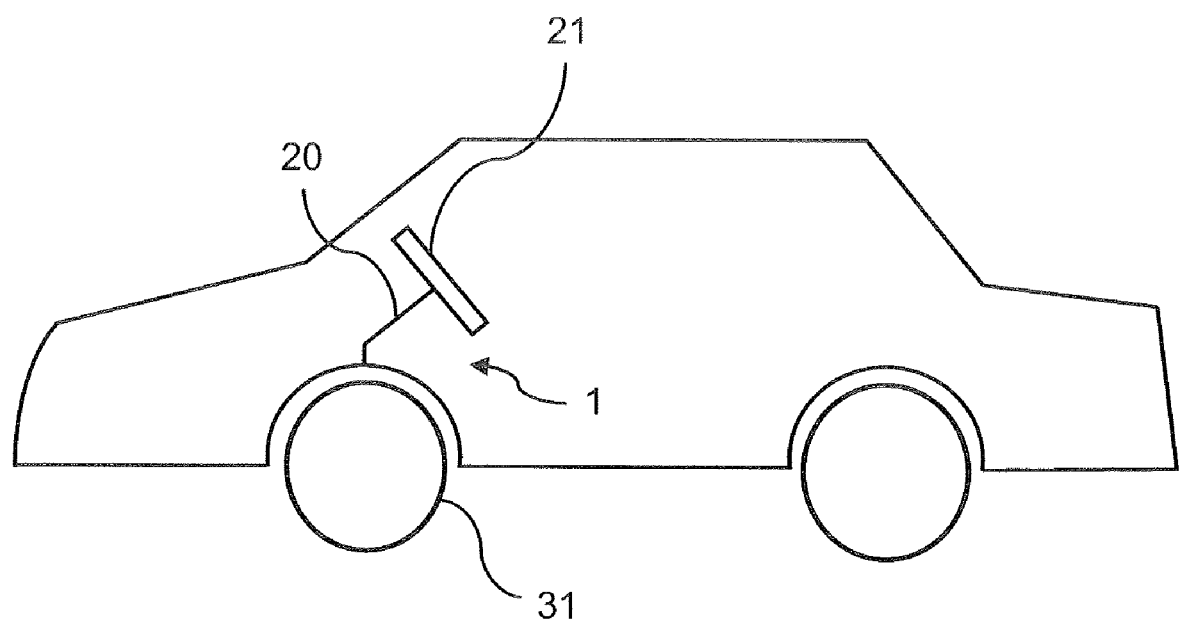
FIG. 7 illustrates a vehicle including a vehicle steering system according to the embodiment of the present invention.

FIG. 7 illustrates a vehicle including a vehicle steering system 1 according to the embodiment of the present invention. The vehicle steering system 1 includes a steering mechanism 20, a steering wheel 21, and turning wheels 31. In the vehicle steering system 1, the steering wheel 21 is coupled to the turning wheels 31 through the steering mechanism 20. In operation of the steering wheel 21 by a driver, the steering mechanism 20 determines a target rudder angle of the turning wheels based on a steering angle of the steering wheel 21.

FIG. 1 is a schematic illustration showing the vehicle steering system 1 according to the embodiment of the present invention.

The vehicle steering system 1 includes the steering mechanism 20 to which a steering operation performed by a driver is input, a rudder mechanism 30 that turns a pair of the turning wheels 31 and 31 on the basis of the steering operation of the steering mechanism 20, and a controller 50 (a target rudder angle finding device) that controls the steering mechanism 20 and the rudder mechanism 30. The vehicle steering system 1 of this embodiment employs so-called steer-by-wire (SBW) system in which the steering mechanism 20 is mechanically separated from the rudder mechanism 30.

The steering mechanism 20 includes a steering wheel 21, a substantially bar-like steering shaft 22, and a reaction force motor 23. The steering wheel 21 is steerable by the driver. The steering shaft 22 rotatably supports the steering wheel 21. The reaction force motor 23 applies a torque to the steering shaft 22.

An output shaft of the reaction force motor 23 is coupled to the steering shaft 22. Accordingly, the reaction force motor 23 can generate a reaction force applied to the steering wheel 21 in a direction to be returned to a neutral position, and a return resistance applied to the steering wheel 21 in a direction opposite to the direction to be returned to the neutral position. The reaction force motor 23 is coupled to the steering shaft 22 with a worm gear mechanism (not shown).

A steering angle detector 24 as steering angle detecting means is provided at the steering shaft 22. The steering angle detector 24 detects a steering angle $\theta h$ (rotation angle) of the steering wheel 21 coupled to the steering shaft 22 with respect to the neutral position. In this embodiment, it is assumed that the steering angle $\theta h$ of the steering wheel 21 is a positive value while the neutral position is defined as $\theta h=0$. Note that the neutral position of the steering wheel 21 corresponds to a position of the steering wheel 21 controlled by the controller 50 such that turning wheels 31 and 31 are brought into a straight-ahead state.

The rudder mechanism 30 includes a substantially bar-like rack shaft 32, a turning actuator 33 that applies a turning power to the rack shaft 32, and the turning wheels 31 and 31 coupled to both ends of the rack shaft 32. The turning actuator 33 is driven corresponding to rotation of the steering wheel 21. The turning actuator 33 is coupled to the rack shaft 32 with a rack-and-pinion mechanism, and hence, the turning actuator 33 can apply the turning power to the rack shaft 32.

The turning wheels 31 and 31 are coupled to both ends of the rack shaft 32 with steering rods 35 and 35, tie rods 36 and 36, and knuckle arms 37 and 37 respectively interposed therebetween. Accordingly, the turning power applied by the turning actuator 33 is converted into linear movement at the rack shafts 32 and 32, and the steering rods 35 and 35, and is transmitted to the turning wheels 31 and 31 via the tie rods 36 and 36, and the knuckle arms 37 and 37, so as to change the steering angle of the turning wheels 31 and 31. The rack shaft 32 is provided with a ruder angle detector 38 that detects the steering angle of the turning wheels 31 and 31. For example, the rudder angle detector 38 is a potentiometer for detecting the operating amount of the steering rod 35.

The controller 50 controls the steering mechanism 20 and the rudder mechanism 30 on the basis of input signals, for example, from a vehicle speed detector 61 as vehicle speed detecting means that detects a vehicle speed V of a vehicle, and from a yow rate detector 62 that detects a yaw rate of the vehicle, in addition to input signals from the above-mentioned steering angle detector 24 and rudder angle detector 38. The steering mechanism 20 is coupled to the controller 50 with a reaction force motor driving circuit 51 interposed therebetween, and the rudder mechanism 30 is coupled to the controller 50 with a turning actuator driving circuit 52 interposed therebetween.

The reaction force motor driving circuit 51 drives the reaction force motor 23 on the basis of the output from the controller 50 to apply the reaction force or the return resistance to the steering wheel 21 in accordance with the travel state of the vehicle and the operation state of the driver.

The turning actuator driving circuit 52 drives the turning actuator 33 on the basis of the output from the controller 50 to turn the turning wheels 31 and 31. The turning actuator driving circuit 52 receives a given control rudder angle δf that is determined by the controller 50 in accordance with the travel state of the vehicle and the operation state with the steering wheel 21. The turning actuator driving circuit 52 drives the turning actuator 33 such that the steering angle of the turning wheels 31 and 31 corresponds to the given control rudder angle δf.

Figure 2:
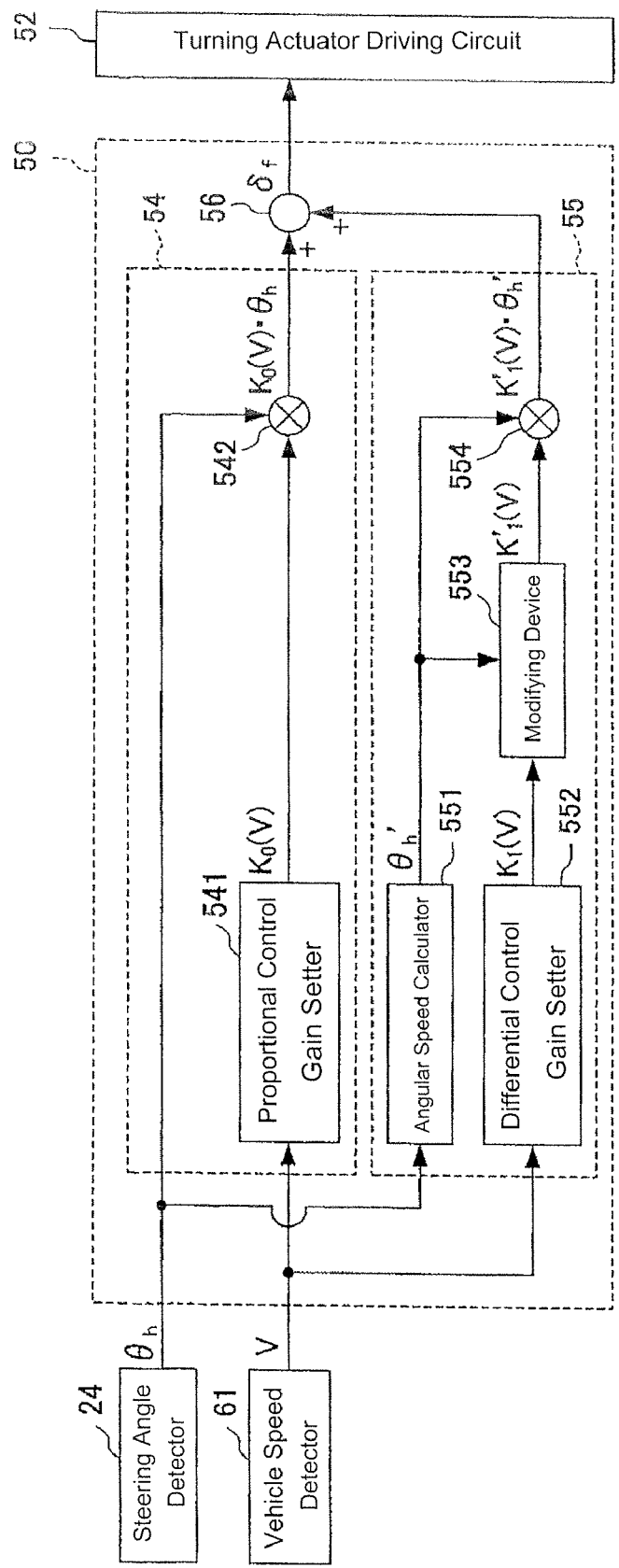
FIG. 2 is block diagram showing a controller of the embodiment.

FIG. 2 is a block diagram showing the controller 50. FIG. 2 only shows a control block of the controller 50, the block relating to the control of the rudder mechanism 30. In particular, FIG. 2 only shows a block of the controller 50, the block relating to determination of the given control rudder angle δf that is output to the turning actuator driving circuit 52.

As shown in FIG. 2, the controller 50 includes a proportional calculator 54, a differential calculator 55, and an adder 56, for calculation of the given control rudder angle δf. The proportional calculator 54 calculates a proportional term that is proportional to a steering angle θh. The differential calculator 55 calculates a differential term that is proportional to a steering angular speed θh'. The adder 56 calculates the sum of the proportional calculated by the proportional calculator 54 and the differential calculated by the differential calculator 55. The controller 50 can output the given control rudder angle δf to the turning actuator driving circuit 52.

The proportional calculator 54 includes a proportional control gain setter 541 for setting a proportional control gain K0(V), and a multiplier 542 for multiplying θh input from the steering angle detector 24 by the proportional control gain K0(V), and outputting the proportional term K0(V)·θh.

The proportional control gain setter 541 has a control map for setting a proportional control gain corresponding to a vehicle speed V. With the control map, a proportional control gain K0(V) is set in accordance with the vehicle speed V input from the vehicle speed detector 61.

The differential calculator 55 includes an angular speed calculator 551, a differential control gain setter 552, a modifying device 553, and a multiplier 554. The angular speed calculator 551 as steering angular speed calculating means calculates a steering angular speed θh' of the steering wheel 21. The differential control gain setter 552 sets a differential control gain K1(V). The modifying device 553 modifies the set differential control gain. The multiplier 554 multiplies the steering angular speed θh' input from the angular speed calculator 551, by the differential control gain K1'(V), and outputs the differential term K1'(V)·θh'.

The angular speed calculator 551 calculates the steering angular speed θh' by arithmetic operation of a time differential of the steering angle θh input from the steering angle detector 24. The differential control gain setter 552 has a control map for setting a differential control gain corresponding to a vehicle speed V. With the control map, a differential control gain K1(V) is set in accordance with the vehicle speed V input from the vehicle speed detector 61.

The modifying device 553 determines whether the steering angular speed θh' input from the angular speed calculator 551 is positive or negative. If the value is negative, that is, if the steering wheel 21 is returned to the neutral position, the modifying device 553 modifies the differential control gain K1(V) set by the differential control gain setter 552 to a smaller value, and determines the smaller value as K1'(V). With the modifying device 553, the differential term with a negative steering angular speed θh' is modified to a value smaller than that with a positive steering angular speed θh'.

The adder 56 calculates the sum of the proportional term K0(V)·θh calculated by the proportional calculator 54 and the differential term K1'(V)·θh' calculated by the differential calculator 55, sets the calculated sum as the given control rudder angle δf, and outputs it to the turning actuator driving circuit 52.

Figure 3:
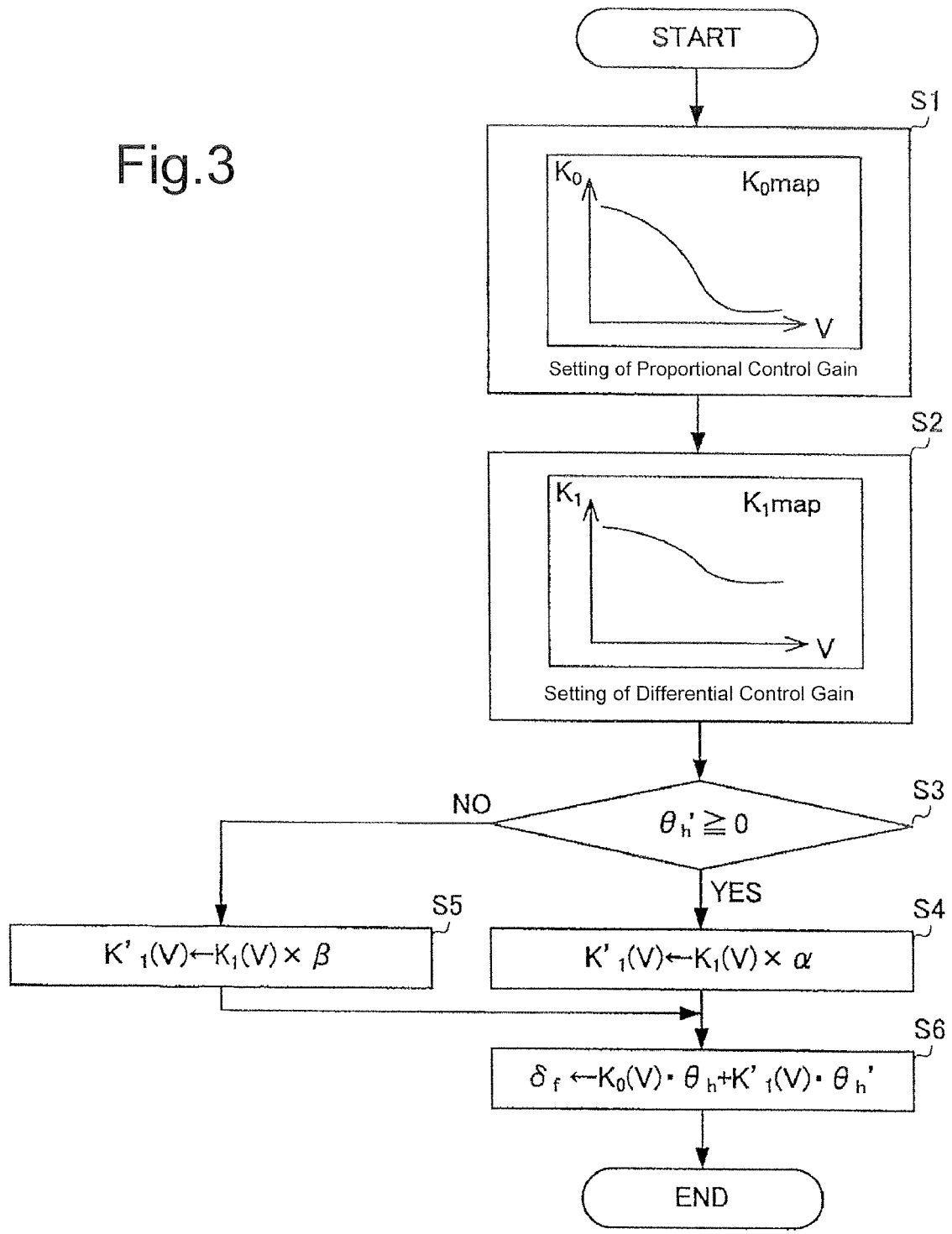
FIG. 3 is a flowchart for the controller of the embodiment.

Next, referring to a flowchart of FIG. 3, a procedure of determining the given control rudder angle δf with the above controller 50 is described.

In step S1, the controller 50 sets the proportional control gain K0(V), and the procedure goes to step S2. The proportional control gain K0(V) is set on the basis of the predetermined control map in accordance with the vehicle speed V as an input value. For example, as shown in FIG. 3, this embodiment utilizes a control map in which the proportional control gain K0(V) becomes small as the vehicle speed V becomes large.

In step S2, the controller 50 sets the differential control gain K1(V), and the procedure goes to step S3. The differential control gain K1(V) is set on the basis of the predetermined control map in accordance with the vehicle speed V as an input value. For example, as shown in FIG. 3, this embodiment utilizes a control map in which the differential control gain K1(V) becomes small as the vehicle speed V becomes large.

In step S3, it is determined whether the steering angular speed θh' is positive (θh'≧0) or not. When the determination is YES, that is, when the steering wheel 21 is turned (normally rotated), the procedure goes to step S4. When the determination is NO, that is, when the steering wheel 21 is returned to the neutral position (rotated in a reverse direction), the procedure goes to step S5.

In step S4, the differential control gain K1(V) is multiplied by a correction coefficient α (a first correction coefficient) to obtain the modified K1'(V), and the procedure goes to step S6. In step S5, the differential control gain K1(V) is multiplied by a correction coefficient β (a second correction coefficient) to obtain the modified K1'(V), and the procedure goes to step S6. It is assumed that the relationship between the correction coefficients α and β is α>β. Accordingly, the differential control gain when the steering wheel 21 is returned to the neutral position is modified to be smaller than that when the steering wheel 21 is turned.

In step S6, the sum of the proportional term K0(V)·θh obtained by multiplying the proportional control gain K0(V) by the steering angle θh, and the differential term K1'(V)·θh' obtained by multiplying the modified differential control gain K1'(V) by the steering angular speed θh' is calculated, to determined the given control rudder angle δf.

EXAMPLE

Next, an example of the vehicle steering system 1 having the above configuration is described with reference to FIGS. 4 to 6. In this example, the correction coefficients α and β of α=1.0 and β=0.3 are applied to the vehicle steering system 1 of the above-described embodiment.

Figure 4:
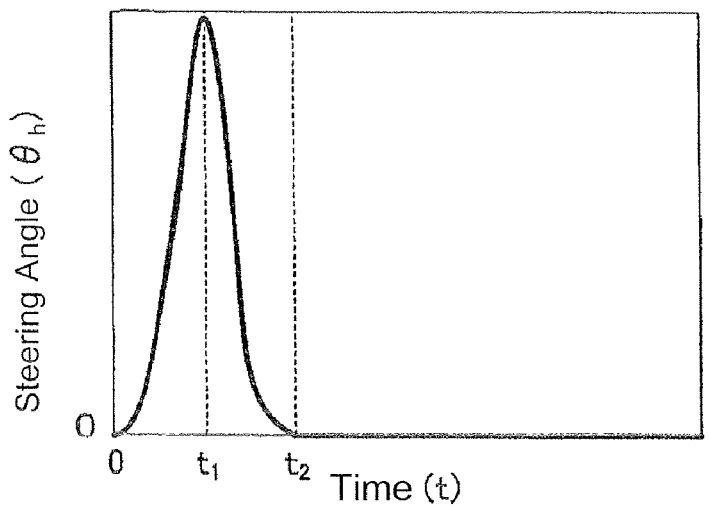
FIG. 4 is a graph showing the relationship between a steering angle $\theta_h$ and a time t of the vehicle steering system according to an example of the present invention.

FIG. 4 is a graph showing the relationship between a steering angle θh and a time t. FIG. 4 illustrates an exemplary steering return operation with the steering wheel 21 in this example.

First, the steering angle θh is varied as shown in FIG. 4. In particular, assuming θh=0 (neutral position) at t=0, the steering wheel 21 is turned for a period from t=0 to t=t1, and then, is stopped at a predetermined steering angle at t=t1. The steering wheel 21 is returned to the neutral position for a period from t=t1 to t=t2, and then, is stopped at the steering angle of θh=0 at t=t2.

Figure 5A:
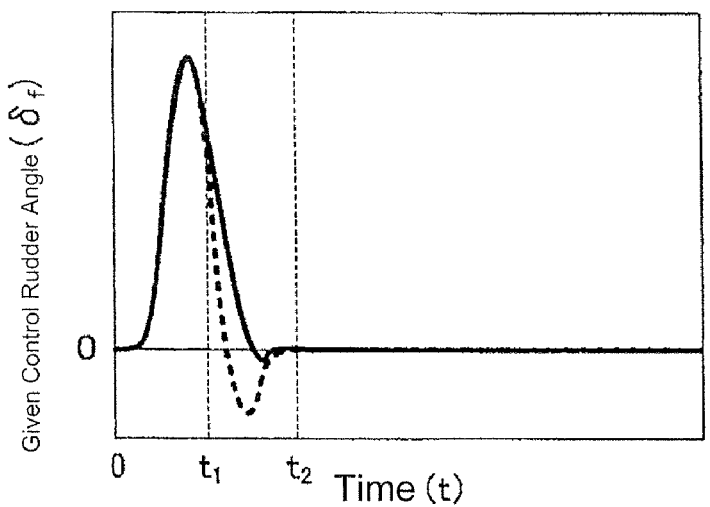
FIGS. 5A and 5B illustrate graphs showing the relationship between a given control rudder angle $\delta_f$ and a time t, and the relationship between a differential term $K_1'(V)\cdot\theta_h'$ and a time t, of the vehicle steering system according to the example.
Figure 5B:
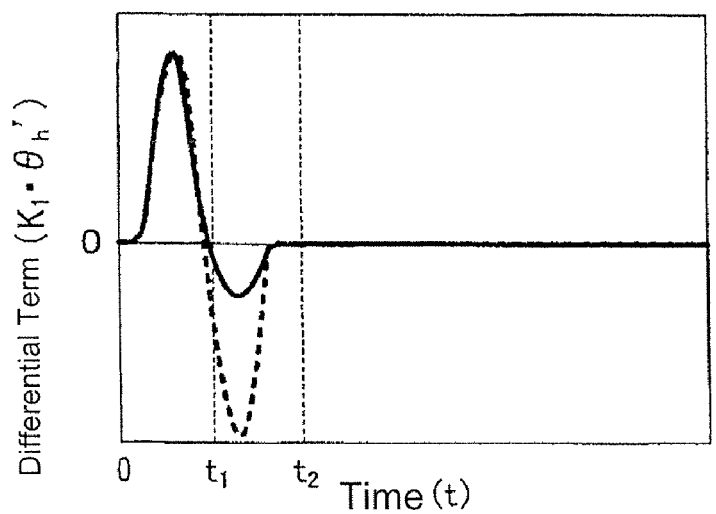
Figure 6A:
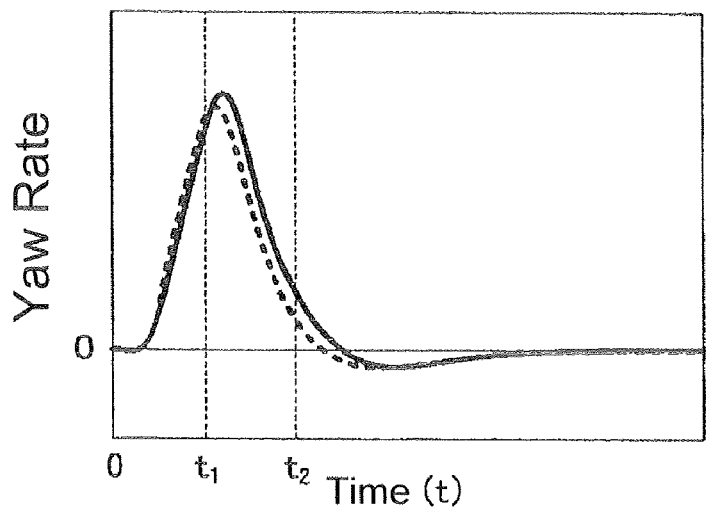
FIGS. 6A, 6B, and 6C illustrate graphs showing the relationship between a yaw rate and a time t, the relationship between a slide angle of a vehicle body and a time t, and the relationship between a lateral acceleration and a time t, of the vehicle steering system according to the example.
Figure 6B:
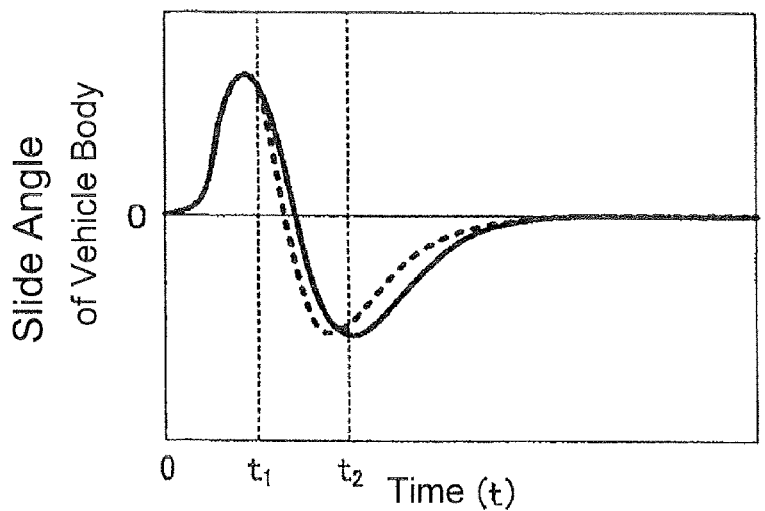
Figure 6C:
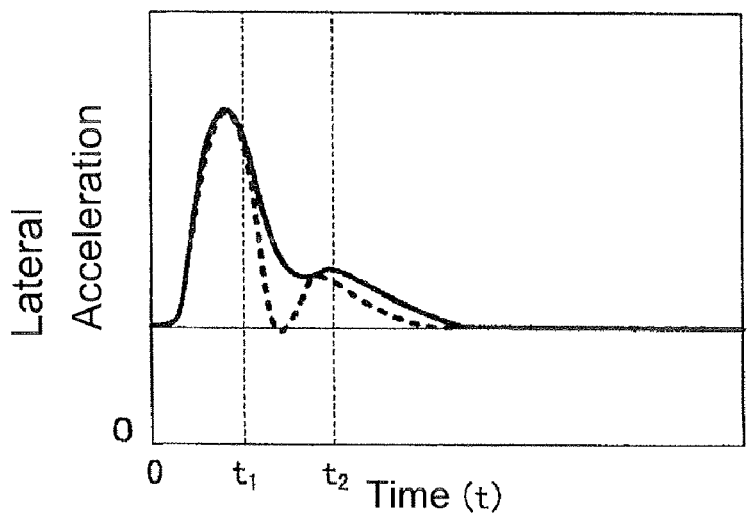

FIGS. 5 and 6 shows vehicle behaviors during the steering return operation shown FIG. 4 in the vehicle steering system, comparing those vehicle behaviors between this example and the comparative example.

FIG. 5 illustrates graphs showing the relationship between a given control rudder angle δf and a time t, and the relationship between a differential term K1'(V)·θh' and a time t. FIG. 5 shows variation of the given control rudder angle δf and the differential term K1'(V)·θh' when the steering operation shown in FIG. 4 is performed. Herein, a solid line indicates the vehicle behavior of this example with the returning modification of the differential term using the correction coefficients of α=1.0 and β=0.3, and a broken line indicates the vehicle behavior of the comparative example with no returning modification in the return operation of the steering wheel 21.

As shown in FIG. 5B, the differential term K1'(V)·θh' is modified such that the amplitude of the differential term becomes smaller than that of the comparative example, because the example performs the returning modification for the period from t=t1 to t=t2, that is, during the return operation of the steering wheel 21.

As show in FIG. 5A, the peak value of the given control rudder angle δf is present at a time slightly before t=t1 in either case of this example and the comparative example because of corresponding to the differential terms in FIG. 5B. As shown in FIG. 5A, after t=t1, the amplitude of the given control rudder steering angle δf becomes smaller than that of the comparative example since the example performs the returning modification. In particular, the given control rudder angle δf is markedly fluctuated in a negative direction during the return operation for the period from t=t1 to t=t2 in the comparative example. In contrast, the given control rudder angle δf is not markedly fluctuated in the negative direction even during the return operation for the period from t=t1 to t=t2 in this example, and hence, the steering operation can be converged immediately as the steering angle θh reaches 0.

FIG. 6 illustrates graphs showing the relationship between a yaw rate and a time t, the relationship between a slide angle of a vehicle body and a time t, and the relationship between a lateral acceleration and a time t. FIG. 6 shows variation of the yaw rate, the slide angle, and the lateral acceleration when the steering return operation shown in FIG. 4 is performed.

As shown in FIG. 6A, the convergence in yaw rate in the example is noticeably improved after the return operation with the steering wheel 21, that is, after t=t2. As shown in FIG. 6B, although the lateral acceleration is markedly fluctuated in the negative direction for the period from t=t1 to t=t2 in the comparative example, the lateral acceleration is not fluctuated in this example. Accordingly, a so-called unintentionally remaining behavior can be prevented when the steering wheel 21 is turned in a reverse direction.

The embodiment of the present invention is described above with reference to the drawings, however, the specific configuration is not limited to one described above, and may include various designs within the scope of the present invention. For example, while the present invention is applied to the steering system of SBW system in the embodiment, the present invention may be applied to a steering system of active steering system, or the like.

What is claimed as new and is desired to be secured by Letters Patent of the United States is:

1. A vehicle steering system comprising:
    a steering wheel;
    a steering angle detector for detecting a steering angle of the steering;
    a steering angular speed calculator for calculating a steering angular speed of the steering;
    a vehicle speed detector for detecting a vehicle speed;
    a target rudder angle finding device for finding a target rudder angle which is based on the steering angle, the steering angular speed, and the vehicle speed; and
    an actuator for turning at least one wheel of the vehicle in accordance with the target rudder angle,
    wherein the target rudder angle is a sum of a proportional term in proportion to the steering angle and a differential term in proportion to the steering angular speed,
    wherein a modifying device modifies a value of the differential term smaller when the steering angular speed is negative comparing to a value of the differential term when the steering angular speed is positive, and
    wherein the steering angular speed is positive when the steering wheel is rotated away from a neutral position, and the steering angular speed is negative when the steering wheel is rotated toward the neutral position.

2. The vehicle steering system according to claim 1, wherein the target rudder angle finding device calculates the proportional term with multiplying the steering angle and a proportional control gain which changes according to a change in the vehicle speed.

3. The vehicle steering system according to claim 2, wherein a value of the proportional control gain is reduced in accordance with the vehicle speed increases.

4. The vehicle steering system according to claim 1, wherein the target rudder angle finding device calculates the differential term with multiplying the steering angular speed and at least a differential control gain which changes according to a change in the vehicle speed.

5. The vehicle steering system according to claim 4, wherein a value of the differential control gain is reduced in accordance with the vehicle speed increases.

6. The vehicle steering system according to claim 1,
wherein the target rudder angle finding device calculates the differential term with multiplying the steering angular speed and a modified differential control gain,
wherein the modifying device calculates the modified differential control gain with multiplying the differential control gain and a correction coefficient, and
wherein a value of the correction coefficient is smaller when the steering angular speed is negative comparing to a value of the correction coefficient with a positive steering angular speed.

7. The vehicle steering system according to claim 6, wherein the correction coefficient includes a first correction coefficient and a second correction coefficient, the first correction coefficient being used as the correction coefficient when the steering angular speed is positive or zero, the second correction coefficient being used as the correction coefficient when the steering angular speed is negative, the second correction coefficient being smaller than the first correction coefficient.

8. A vehicle steering system comprising:
a steering wheel;
steering angle detection means for detecting a steering angle of the steering wheel;
steering angular speed calculation means for calculating a steering angular speed of the steering wheel;
vehicle speed detection means for detecting a vehicle speed;
target rudder angle finding means for finding a target rudder angle which is based on the steering angle, the steering angular speed and the vehicle speed; and
actuator means for turning at least one wheel of the vehicle in accordance with the target rudder angle,
wherein the target rudder angle is a sum of a proportional term in proportion to the steering angle and a differential term in proportion to the steering angular speed,
wherein modifying means modifies a value of the differential term smaller when the steering angular speed is negative comparing to a value of the differential term when the steering angular speed is positive, and
wherein the steering angular speed is positive when the steering wheel is rotated away from a neutral position, and the steering angular speed is negative when the steering wheel is rotated toward the neutral position.

9. A vehicle comprising:
a wheel;
a steering wheel;
a steering angle detector for detecting a steering angle of the steering wheel;
a steering angular speed calculator for calculating a steering angular speed of the steering wheel;
a vehicle speed detector for detecting a vehicle speed;
a target rudder angle finding device for finding a target rudder angle which is based on the steering angle, the steering angular speed, and the vehicle speed; and
an actuator for turning at least one wheel of the vehicle in accordance with the target rudder angle;
wherein the target rudder angle is a sum of a proportional term in proportion to the steering angle and a differential term in proportion to the steering angular speed,
wherein a modifying device modifies the differential term smaller when the steering angular speed is negative comparing to a value of the differential term when the steering angular speed is positive, and
wherein the steering angular speed is positive when the steering wheel is rotated away from a neutral position, and the steering angular speed is negative when the steering wheel is rotated toward the neutral position.

10. A method for turning at least one wheel of a vehicle comprising:
detecting a steering angle of a steering wheel of the vehicle;
calculating a steering angular speed of the steering wheel;
detecting a vehicle speed;
finding a target rudder angle which is based on the steering angle, the steering angular speed, and the vehicle speed, wherein the target rudder angle is a sum of a proportional term in proportion to the steering angle and a differential term in proportion to the steering angular speed;
modifying a value of the differential term smaller when the steering angular speed is negative comparing to a value of the differential term when the steering angular speed is positive; and
turning at least one wheel of the vehicle in accordance with the target rudder angle,
wherein the steering angular speed is positive when the steering wheel is rotated away from a neutral position, and the steering angular speed is negative when the steering wheel is rotated toward the neutral position.

* * * * *